Sept. 14, 1965   W. J. GREENLEAF   3,205,559
ROTARY CUTTING TOOL
Filed Jan. 27, 1964

INVENTOR.
Walter J Greenleaf
BY Ralph Hammar
Attorney

3,205,559
ROTARY CUTTING TOOL
Walter J. Greenleaf, R.D. 3, Meadville, Pa.
Filed Jan. 27, 1964, Ser. No. 340,130
3 Claims. (Cl. 29—105)

This invention is a rotary cutting tool constructed so a large number of indexable blades may be used. Each blade is received in a slot and an individual adjustment is provided which permits accurate positioning.

Figure 1:
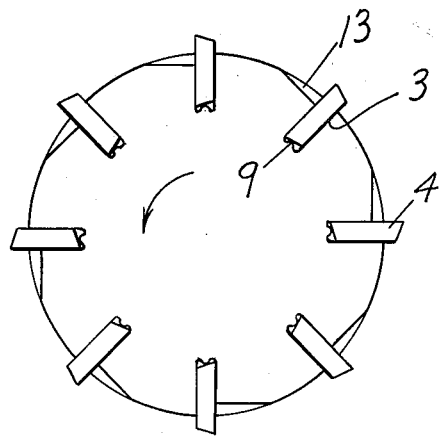
Figure 2:
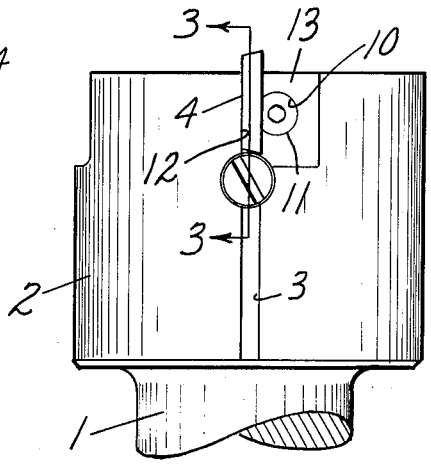
Figure 3:
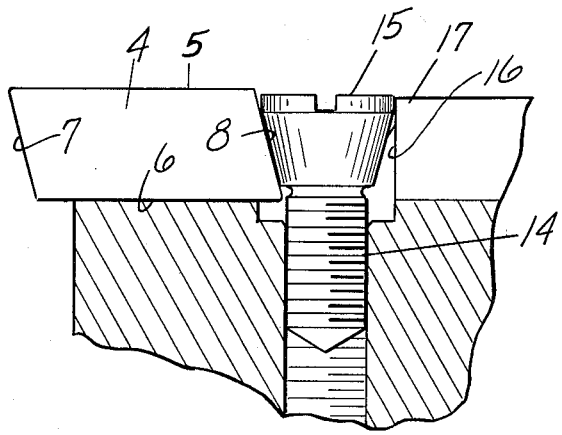

In the drawing, FIG. 1 is an end view of a milling cutter; FIG. 2 is a side view, only one of the blades being shown for convenience; and FIG. 3 is a section on line 3—3 of FIG. 2.

The milling cutter has a shank 1 for driving and a head 2 provided with a plurality of axial slots 3 for receiving bits 4 having top and bottom edges 5 and 6 parallel to each other and having front and back edges 7 and 8 also parallel to each other. The inclination of the slots and the bits are related to provide the desired clearance and rake angles. At the bottom of each of the slots is a formed seat 9 for the bottom edge 6 of the blade. In front of each of the slots is a socket 10 for a wedge member or lock 11 clamping the bit against the back edge 12 of the slot. A recess 13 provides chip clearance.

To permit indexing of the bit 4, the top and bottom edges 5 and 6 are parallel to each other and the front and back edges 7 and 8 are also parallel to each other. When the bit is turned end for end, it occupies the same position in the slot. The seats 9 at the bottom of the slots 3 position the blade accurately at the same radial distance from the axis of the tool. The seats 9 can be very accurately formed and no adjustment is necessary. The axial positioning of each blade in its slot 3 is effected by a screw 14 having a cylindrical head 15 slidably received in a counterbore or socket 16 centered on the slot. The cylindrical head 15 guides the radial movement of the screw and prevents tilting of the screw which could result in inaccurate positioning. Preferably the cylindrical head 15 is ground to fit the counterbore or socket 16. Below the cylindrical section 15 of the screw head is a tapered section 17 parallel to the front and back edges 7 and 8 of the bit. Turning of the screw 14 accordingly provides an adjustable stop, fixing the axial projection of the bit. By this arrangement, each of the bits is independently adjustable and can be set to take an equal share of the cutting load. Once the screw is adjusted for any particular bit, it need not be readjusted when the bit is turned end for end to bring a fresh edge into cutting position.

It will be noted that the arrangement of the socket 10 for the wedge lock in the chip clearance space and the location of the hole 16 at the back end of the blade slot 3 results in a minimum of space requirement and thereby permits the use of a maximum number of cutting blades.

When bits are replaced, no adjustment of the screws is required.

What is claimed as new is:

1. A rotary cutting tool having a head with axially extending slots distributed about the periphery of the head, a bit in each slot, said bit having axially spaced front and back edges parallel to each other, wedge means clamping the bit against one side of the slot, a cylindrical counterbore in the head intersecting and extending toward the bottom of the slot, a screw having a head with a cylindrical surface fitting the counterbore and with a conical surface parallel to and engaging the back edge of the bit.

2. A rotary cutting tool having a head with axially extending slots distributed about the periphery of the head, a bit in each slot, said bit having axially spaced front and back edges parallel to each other, wedge means clamping the bit against one side of the slot, a screw threaded into the bottom of the slot, the head of the screw having a conical surface parallel to and engaging the back edge of the bit.

3. A rotary cutting tool having a head with an axially extending slot, a bit in the slot, said bit having axially spaced front and back edges parallel to each other, means clamping the bit against one side of the slot, a cylindrical counterbore in the head intersecting and extending toward the bottom of the slot, a screw threaded into the bottom of the slot, the head of the screw having a cylindrical surface fitting the counterbore and a conical surface parallel to and engaging the back edge of the bit.

No references cited.

WILLIAM W. DYER, Jr., *Primary Examiner.*